Oct. 4, 1966 — G. HULTSCH — 3,276,591

APPARATUS FOR TREATING SUSPENSIONS

Filed Dec. 3, 1963 — 2 Sheets-Sheet 1

INVENTOR.
Günther Hultsch

BY Michael S. Striker

United States Patent Office 3,276,591
Patented Oct. 4, 1966

3,276,591
APPARATUS FOR TREATING SUSPENSIONS
Gunther Hultsch, Munich, Germany, assignor to Krauss-Maffei Aktiengesellschaft, Munich-Allach, Germany
Filed Dec. 3, 1963, Ser. No. 327,693
Claims priority, application Germany, Dec. 5, 1962,
K 48,387
13 Claims. (Cl. 210—213)

The present invention relates to an apparatus for treating suspensions, and more particularly for separating the solid particles from the liquid of a suspension by means of a centrifuge.

The known devices serving this purpose use filtration or sedimentation for achieving the separation. A comparative long time of treatment is required, and the removal of the deposited solid particles from the filter or sump, respectively, is time consuming and requires special apparatus. According to another approach, the suspension is guided in the form of a helically shaped liquid body in tangential direction in a downwardly tapered container whereby a certain classification of the solid particles, but not a complete separation of the solid particles from the liquid of the suspension is achieved so that additional filtering and sedimentation steps are required.

It is one object of the invention to provide an apparatus for treating suspensions in such a manner that the solid particles are separated from the liquid of the suspensions in a very short time, and in a very economical manner.

Another object of the invention is to provide a separating apparatus for a suspension which at the same time enables a complete classification of the separated solid particles.

Another object of the invention is to provide an apparatus for separating the solid particles from the liquid of a suspension which is of simple construction, and permits the removal of the separated solid particles from the apparatus in a very simple and economical manner.

Another object of the invention is to provide an apparatus for separating the solid particles from the liquid of a suspension having separate means for collecting the liquid, and classified parts of the total quantity of separated solid particles.

With these objects in view, a suspension is supplied to a surface in such a manner that a thin layer of the suspension forms on the surface, and the layer is subjected to a transverse outwardly directed force which is less than the adhesion of the liquid to the surface. While the liquid is retained by adhesion on the surface, the solid particles move away from the surface and thus the solid particles and the liquid can be recovered separately.

The transverse force is either the force of gravity, or preferably the centrifugal force. In the first case, a downwardly facing surface is inclined to such a degree that the downwardly directed force of gravity is sufficient to cause the dropping off of the solid particles, while the liquid will adhere to the surface and slowly flow along the same in downward direction. A frusto-conical surface with a vertical axis having its narrowest part located below its widest part may be used.

According to the preferred embodiment of the invention, the solid particles are subjected to the centrifugal force. In this embodiment of the invention, the suspension is supplied to a central portion of a surface of revolution, preferably a frusto-conical surface, in such a manner that a thin layer of suspension forms on the surface. This is preferably accomplished by rotating the surface at a suitable speed about a vertical axis.

The speed of rotation is selected in such a manner that the centrifugal force acting on the layer of the suspension is less than the adhesion of the liquid to the surface. Thus, the solid particles move away from the surface under the action of the centrifugal force while the liquid is retained by adhesion on the surface. The solid particles and the liquid are separately recovered in regions spaced from the surface, and adjacent the surface, respectively. The acceleration provided by the centrifugal force should exceed the acceleration of the force of gravity.

Since the adhesion of smaller solid particles to the surface is greater than the adhesion of larger solid particles, the larger solid particles are separated first from the liquid and the smallest solid particles separate last. Due to this fact, classification of the solid particles can be achieved particularly if a flaring surface, for example a conoidal or frusto-conical surface is used. In the region of the widest diameter of the conoidal surface where the liquid flows off, the finest solid particles are separated, whereas the largest solid particles are separated from the liquid in the region of the smallest diameter of the conoidal surface.

An apparatus according to the present invention provides suitable collecting means, for example annular plates spaced from each other in axial direction along a conoidal surface of a rotating body. However, an apparatus according to the invention may have a different surface of revolution, for example a cylindrical surface. An apparatus according to the invention employing the centrifugal force comprises a body having an outer surface of revolution, supply means for supplying a suspension to the surface, means for rotating the body about an axis at such a speed that the suspension flows along the surface and forms thereon a thin layer and that the centrifugal force is less than the adhesion of the liquid to the surface, and means for separately recovering the solid particles and the liquid.

The solid particles move away from the surface while the liquid is retained by adhesion on the surface.

In the preferred embodiment, a conoidal or otherwise outwardly flaring surface is rotated about its axis, preferably about a vertical axis. The widest portion of the conoidal surface is preferably located at the lowest point so that the liquid flows over the peripheral edge of the surface in downward direction to the collecting means.

However, it is also possible to use the force of gravity instead of the centrifugal force and in this event, the body has a surface of revolution with a horizontal axis, and it is either at a standstill, or rotated at a very slow speed just sufficient to cause a uniform flow of this suspension in a thin layer along the surface. The liquid adheres to the surface of revolution, which may be cylindrical, and flows to the lowest point of the same where it drops off into a suitable narrow collecting container extending in axial direction. The solids are subjected to the force of gravity to such an extent that they separate from the liquid layer and drop laterally of the collecting container for liquid into other collecting containers arranged on opposite sides of the container for collecting the liquid.

The apparatus of the invention is advantageously combined with a continuously operating filter centrifuge. Continuously operating filter centrifuges require a predetermined concentration of the solid particles in order to assure the filtration. This concentration can be obtained without any prethickening with an apparatus according to the invention. The bottom of the centrifuge is provided with a separating surface according to the invention, and the solid particles separated from the rotating surface by the action of the centrifugal force are guided over the filter member of the centrifuge where further liquid is removed and the solid particles are dried.

Since in the arrangement of the present invention, the solid particles are classified according to size, the apparatus can be constructed in such a manner that the fine particles are deposited on the filter drum of the centrifuge on the large-size particles which are first deposited so that the larger sized particles form a filtering layer improving the filtration effect.

Instead of a perforated filter drum or cone, one or several annular members forming gaps between each other may be provided on which the liquid still contained in the deposited solid particles adheres so that a further separation takes place.

It is advantageous to provide such an arrangement if means for washing the solid particles are provided and then to remove the washing liquid in this manner.

The novel features which are considered as characteristic for the invention are set forth in particular in the appended claims. The invention itself, however, both as to its construction and its method of operation together with additional objects and advantages thereof, will be best understood from the following descriptions of specific embodiments when read in connection with the accompanying drawings, in which:

Figure 1:
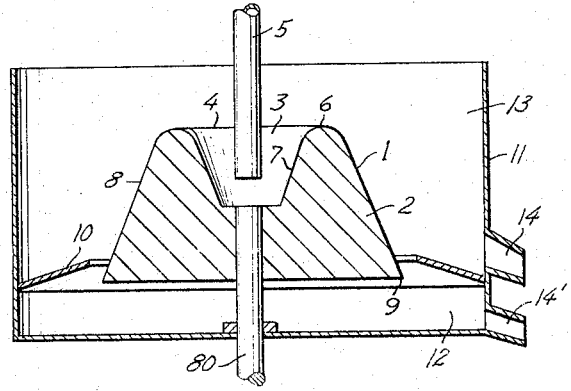
FIG. 1 is a fragmentary schematic axial sectional view illustrating one embodiment of the invention.

Referring now to the drawings, and more particularly to FIG. 1 which illustrates a simple construction of the present invention, a shaft 80 is mounted in a bearing of a supporting housing 11 and carries at its upper end a body 2 which has substantially frusto-conical shape and a central recess 3. Recess 3 has a frusto-conical surface connected by a curved annular surface 6 to the outer frusto-conical separation surface 8. A supply tube 5 extends coaxial with a vertical shaft 80 into the recess 3 and has an outlet opening opposite the circular bottom of recess 3.

When a suspension is supplied through supply tube 5 into recess 3, the suspension first rises in recess 3 along the surface 7 and flows over the outer frusto-conical surface 8 from the circle 4 of smallest diameter to the circle 9 of greates diameter of frusto-conical surface 8. Due to the adhesion of the liquid of the suspension to surface 8, and promoted by the rotation of body 2 by circle 9 of greatest diameter of frusto-conical surface 8. and moves downwardly toward the lower end of surface 8. The fact that the suspension must first rise along the surface 7 of recess 3 means of course, that the path it must traverse before reaching surface 8 is longer than if recess 3 were absent. This is beneficial to the desired end result, as is the fact that the suspension must change its path quite abruptly, to flow from surface 7 onto surface 8.

The speed of rotation of shaft 80 and body 2 are so selected that the centrifugal force acting outwardly and in horizontal direction is less than the adhesion of the liquid to surface 8, but sufficient to cause separation of the solid particles from the liquid of the suspension. Consequently, the solid particles are thrown outwardly from surface 8 in tangential direction and are collected on the upper surface of an annular collecting member 10 which surrounds the lower end of the frusto-conical surface 8. An outlet 14 is provided in the upper portion 13 of container 11 to permit the discharge of solid particles accumulated on top of collecting member 10. Another outlet 14' is located in the lower container portion 12 below collecting member 10, and permits the discharge of liquid dropping from the lower edge of body 2 in the region of the diameter 9 onto the bottom of container 11. While surface 8 is shown to be provided on a solid body, a hollow body formed of a single molded wall may also be used.

Figure 2:
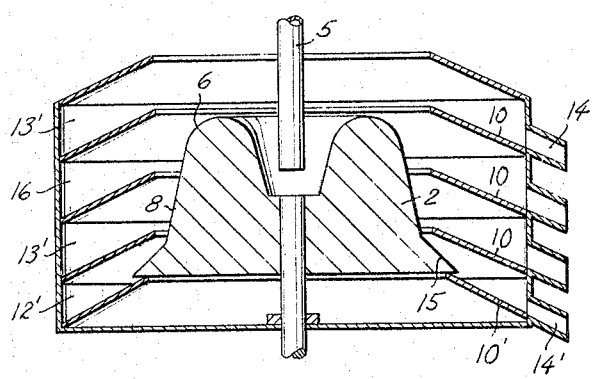
FIG. 2 is a fragmentary schematic axial sectional view illustrating a modified embodiment of the invention.

The embodiment of FIG. 2 corresponds substantially to the embodiment of FIG. 1. A lower frusto-conical surface 15 is added to the frusto-conical surface 8 and is slanted at a steeper angle to the axis of rotation than surface 8. In this manner, a more rapid separation of the liquid from the body 2 is achieved, since the different inclination of surface 15 will provide a greater component of the centrifugal force acting along surface 15 on the liquid layer flowing thereon.

A frusto-conical collecting plate 10' is located below body 2 and forms a collecting space 12' from which the liquid is discharged from outlet 14'.

Due to the fact that the particles of greater mass and size separate sooner from the surface of the revolution 8 than the particles of smaller size, a classification of the particles is achieved by a plurality of collecting means 10 which are spaced in axial direction from each other and define collecting chambers 13' each of which is connected to an outlet 14. The container wall 16 is of cylindrical shape and supports the collecting plates 10.

The largest particles will be collected in the uppermost compartments 13', medium sized particles in the intermediate compartments 13' and the lightest particles in the lowest space 13'. It will be noted that the heaviest particles will be thrown off the curved surface 6 in slightly upward direction into the uppermost compartment 13'.

Figure 3:
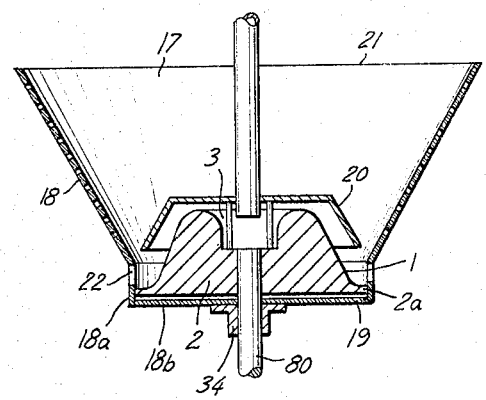
FIG. 3 is a fragmentary schematic axial sectional view illustrating another embodiment of the invention provided with a filter cone.

The construction illustrated in FIG. 3 provides a rotary body 2 which has a surface of revolution as described with reference to FIG. 1, but the lowest portion of greater diameter is extended to form a horizontal flange 2a. A filter member 17 surrounds body 2 and has a frusto-conical outwardly flaring perforated portion 18, a lower cylindrical portion 18a, and a bottom portion 18b which is secured to a hollow shaft 34 surrounding shaft 80. Outlet openings 22 are formed in portion 18a, and flange 2a extends to the inner surface of portion 18a.

An annular shield 20 of frusto-conical shape is mounted in recess 3 of body 2 by means of a hub portion and extends around the top portion of body 2.

When the suspension is supplied to the recess 3 and flows over the surface of revolution 1 as a thin layer, the centrifugal force causes separation of the solid particles from surface 1. The larger particles which are thrown off the upper portion of surface 1 impinge shield 20 and move along the same in outward direction due to the centrifugal force acting on the rotating shield. The solid particles pass from the lower edge of shield 20 to the inner frusto-conical surface of portion 18 of filter member 17.

During rotation of filter member 17 by the hollow shaft 34, the centrifugal force will urge particles deposited on portion 18 to move upward and outward, while liquid still contained in the deposited solid particles will pass through the perforations of portion 18.

At the same time, the liquid will flow along surface 1 to the surface of flange 2a and from there through outlet openings 22 so that the solid particles and the liquid can be separately collected by providing a suitable annular container. Not only the liquid discharged through outlet 22, but also the liquid flowing out of the perforation of member 18 tends to adhere to the outer surface of member 18 and to flow downwardly along the same to the cylindrical portion 18a below which the collecting container for the liquid is provided.

If body 2 is constructed higher in relation to portion 18, filter member 17 need not be rotated, and the solid particles will form a deposit on the inner surface of portion 18, while the liquid still contained in the solid particles will drop through the perforations due to the action of the force of gravity.

Figure 5:
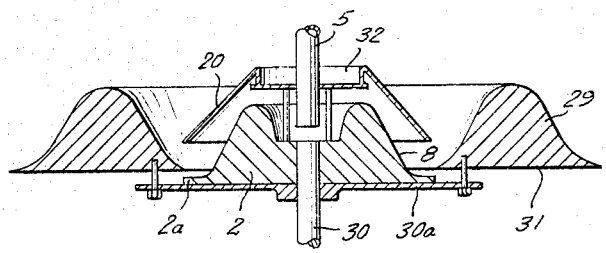
FIG. 5 is a fragmentary schematic axial sectional view illustrating another embodiment of the invention.

The embodiment of FIG. 5 provides a rotary member which includes a body 2 substantially as described with reference to FIG. 3, and a second annular body 29 surrounding body 2.

A shield 20 of annular frusto-conical configuration is mounted on body 2 for rotation therewith and has a container portion 32 at the upper center thereof to which a washing liquid is supplied. The outer body 29 has an inner outwardly flaring surface and a bottom 31 which is located slightly above the flange portion 2a of body 2 and forms an annular gap with the same. A member 30a is secured to the vertical shaft 30, and attaches bodies 2 and 29 to shaft 30 so that the bodies are rotated at the same speed together with shield 20.

Shield 20 has a lower edge located in the region of the middle portion of the conoidal surface 8 of body 2, and opposite the lower portion of the inner surface of body 29.

When shaft 30 and the bodies rotate while a suspension is supplied through tube 5, the liquid flows along surface 8 and over flange 2a to a collecting container, not shown. Solid particles are separated from the surface by the action of the centrifugal force and thrown toward the inner surfaces of body 29 and shield 20. Washing liquid supplied to container 32 flows along the inner surface of shield 20 toward the lower portion of the inner surface of body 29 together with solid particles deposited on shield 20. The solid particles and the washing liquid flow outwardly and upwardly along the outwardly flaring inner surface of the annular body 29 and to the outer surface of body 29 from which the solid particles are thrown off by the action of the centrifugal force, while the adhering liquid flows over the lower edge of the outer surface of the body 29 to a suitable collecting container.

In this manner, the method of the present invention is used not only for separating the solid particles from a liquid of a suspension, but also for separating the solid particles from a washing liquid.

Figure 6:
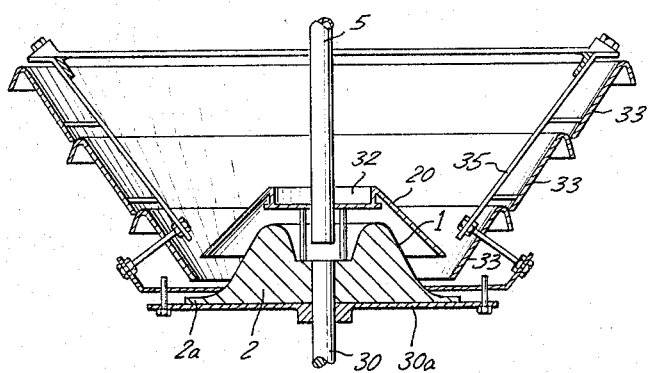
FIG. 6 is a fragmentary schematic sectional view illustrating a further embodiment of the invention.

The embodiment of FIG. 6 includes a shaft 30 supporting a rotary body 2 with a flange 2a, a member 30a being secured to shaft 30 and supporting not only body 2, but also a frame 35 on which three annular frusto-conical members 33 are mounted. Annular members 33 are separated by annular gaps, and the edge of the lowermost annular member 33 is spaced from the outer surface 1 of body 2 to form an outlet gap for the liquid. An annular shield 20 is again mounted in the recess of body 2 for rotation with the same and has a container 32 for the washing liquid.

When the apparatus is rotated, solid particles pass from the upper portion of body 2 to the inner surface of shield 20 where they are mixed with washing liquid and deposited on the inner surface of the lowermost annular member 33. The mixture of solid particles and washing liquid passes upwardly along the lowest member 33 until the liquid, adhering the surface of member 33 passes through the annular gap surrounding the upper edge of the lowest member 33, while the solid particles are thrown to the next higher annular member 33. This separating process is repeated on the second and third annular member 33 so that the solid particles are completely separated from the liquid of the suspension, and from the washing liquid. It will be understood that the lowest member 33 corresponds to member 29 of the embodiment of FIG. 5, but is of a lighter construction.

In the same manner as several annular members 33 are provided instead of the single annular member 29, it is also possible to provide several bodies 2 above each other along the vertical shaft 30 and the supply tube 5. In such a construction, several axially spaced outlet openings for the suspensions are provided in the supply tube 5 so that the suspension flows onto each outer surface of the several bodies 2.

In such a construction, each body 2 is provided with an annular collecting plate corresponding to collecting plate 10 in FIG. 1 so that the liquid and solid particles of the respective body can be separately collected.

Figure 4:
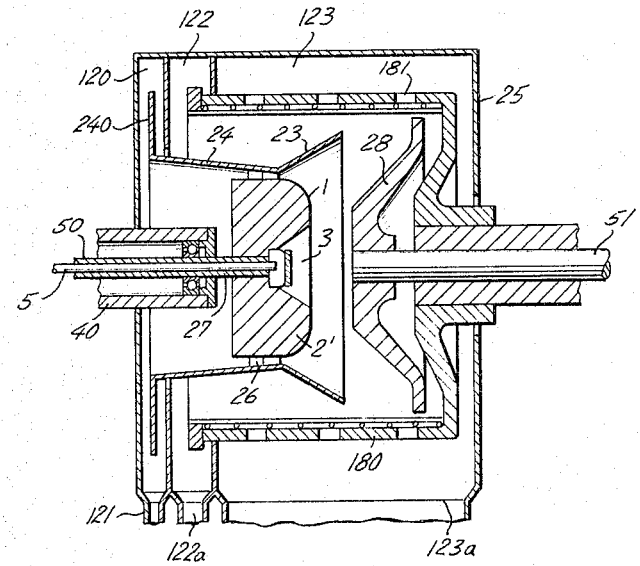
FIG. 4 is a fragmentary axial sectional view illustrating an embodiment of the invention combined with a filter centrifuge.

The embodiment of FIG. 4 combines a filter centrifuge with a rotary separating body according to the present invention.

A body 2' of generally cylindrical shape with a rounded edge is secured to a horizontal hollow shaft 50 surrounding the supply tube 5 which opens in a recess 3 of body 2'. The suspension is distributed over the surface of revolution 1 and the liquid adheres to surface 1 whereas the solid particles are outwardly thrown toward a frusto-conical annular member 23 whose narrower end is connected to a tubular member 24 having a flange 240 extending into a collecting chamber 120 provided with an outlet 121. Liquid adhering to the surface of revolution 1 will be deposited on the inner surface of tubular portion 24 and be discharged from outlet 21. Member 23, 24 is secured by connecting spokes 26 to body 2 and rotates with the same. A bore 27 is provided in body 2' for shaft 50.

Smaller solid particles are deposited on the inner surface of frusto-conical member 23 and travel outwardly on the same, while larger particles are deposited on the rotary member 28 which is driven by shaft 51. Rotary member 28 throws the coarser particles against the filter drum 180 to travel along the same toward the chamber 122 which has an outlet 122a. The finer particles are thrown from annular member 23 on the inner surface of the filter drum member 180 and are deposited on the layer of coarser particles so that additional filtration takes place, the liquid contained in the solid particles being thrown outwardly through the openings 181 of filter drum member 180 and being collected in chamber 123 which has an outlet 123a.

The filter drum member and the rotary body may be driven at different speeds, and in opposite directions in the embodiment of FIGS. 3 and 4, since the rotary speed of body 2 depends on the force of adhesion acting on the liquid, whereas the centrifugal force of the filter drum elements is selected for achieving a sufficient centrifugal force to drive the liquid through the perforations of the filter drum member.

It will be understood that each of the elements described above or two or more together, may also find a useful application in other types of separating methods and apparatus differing from the types described above.

While the invention has been illustrated and described as embodied in a method for separating the solid particles from the liquid of a suspension by the action of centrifugal force acting on the solid particles while the liquid is retained by adhesion on a rotating surface, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. An apparatus for separating solid particles from the liquid of a suspension, comprising, in combination, a body having at opposite ends thereof portions of greatest and smallest diameter respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; supply means for supplying a suspension to said central recess; means for rotating said body about the axis of said surface at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; and means for separately recovering said solid particles and said liquid.

2. An apparatus for separating solid particles from the liquid of a suspension, comprising, in combination, a body having a vertical axis and having at opposite ends portions of greatest and smallest diameter, respectively, and an outwardly flaring outer surface between said portions, said body also having at said portion of smallest diameter a relatively deep central recess and a curved annular surface portion connecting said portion forming said recess with said outwardly flaring outer surface; supply means for supplying a suspension to said central recess; means for rotating said body about said vertical axis at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; and means for separately recovering said solid particles and said liquid.

3. An apparatus for separating solid particles from the liquid of a suspension, comprising, in combination, a body having at opposite ends thereof portions of greatest and smallest diameter, respectively, and an outwardly flaring outer conoidal surface between said portions, said body also having at said portion of smallest diameter a relatively deep central recess bounded by a surface portion of said body flaring outwardly at least in the region adjacent to the open end of said recess and merging along said open end into said outwardly flaring conoidal surface of said body; supply means for supplying a suspension to said central recess, said conoidal outer surface including an inner frusto-conical surface portion and an outer frusto-conical surface portion inclined at a different angle than said inner frusto-conical surface portion; means for rotating said body about the axis of said outer surface at such a speed that the suspension flows from said recess onto said inner frusto-conical surface portion of said conoidal outer surface and forms on said outer surface a thin layer and that the centrifugal force acting on said layer is less than the adhesion of the liquid to said outer surface whereby the solid particles move away from said outer surface while the liquid is retained by adhesion on said outer surface; and means for separately recovering said solid particles and said liquid.

4. An apparatus for separating solid particles from the liquid of a suspension, comprising, in combination, a body having at opposite ends thereof portions of greatest and smallest diameter, respectively, and an outwardly flaring outer conoidal surface between said portions, said body also having at said portion of smallest diameter a relatively deep central recess bounded by a surface portion of said body flaring outwardly at least in the region adjacent to the open end of said recess and merging along said open end into said outwardly flaring conoidal surface of said body; supply means for supplying a suspension to said central recess, said conoidal outer surface including an inner frusto-conical surface portion and an outer frusto-conical surface portion inclined at a different angle than said inner frusto-conical surface portion; means for rotating said body about the axis of said outer surface at such a speed that the suspension flows from said recess onto said inner frusto-conical surface portion of said conoidal outer surface and forms on said outer surface a thin layer and that the centrifugal force acting on said layer is less than the adhesion of the liquid to said outer surface whereby the solid particles move away from said outer surface while the liquid is retained by adhesion on said outer surface; and a plurality of annular axially spaced plates surrounding said body for separately recovering said solid particles and said liquid.

5. An apparatus for separating solid particles from the liquid of a suspension, comprising, in combination, a body having at opposite ends thereof portions of greatest and smallest diameter, respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; supply means for supplying a suspension to said central recess; means for rotating said body about the axis of said outer surface at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; and an annular plate surrounding said body and having an inner edge located opposite said outer surface adjacent the greatest diameter thereof so that said solid particles are recovered on one side of said annular plate and said liquid is recovered on the other side of said annular plate.

6. An apparatus for separating solid particles from the liquid of a suspension, comprising, in combination, a body having at opposite ends thereof portions of greatest and smallest diameter, respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; supply means for supplying a suspension to said central recess; means for rotating said body about the axis of said outer surface at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; and a rotary member surrounding said body and having a first portion located in the region of the greatest diameter of said outer surface and forming an opening for the discharge of liquid flowing from said outer surface, and a second outwardly flaring liquid permeable portion for collecting solid particles outwardly thrown from said outer surface whereby said solid particles and said liquid are separately recovered.

7. An apparatus for separating solid particles from the liquid of a suspension, comprising, in combination, a body having at opposite ends thereof portions of greatest and smallest diameter, respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; supply means for supplying a suspension to said central recess; means for rotating said body about the axis of said outer surface at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; a rotary member surrounding said body and having a first portion located in the region of the greatest diameter of said outer surface and forming an opening for the discharge of liquid flowing from said outer surface, and a second outwardly flaring liquid permeable portion for collecting solid particles outwardly thrown from said outer surface whereby said solid particles and said liquid are separately recovered; and means for rotating said body and said member at different speeds.

8. An apparatus as set forth in claim 7 wherein said second liquid permeable portion includes a plurality of annular members of different diameter and separated by annular gaps permitting passage of said liquid and wherein said first portion surrounds said body to form with the same said discharge opening.

9. An apparatus for separating solid particles from the liquid of a suspension, comprising, in combination, a body having at opposite ends thereof portions of greatest and smallest diameter, respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; an annular shield surrounding the portion of smallest diameter of said body; supply means for supplying a suspension to said central recess; means for rotating said body about the axis of said outer surface at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; and means for separately recovering said solid particles and said liquid.

10. An apparatus for separating solid particles from the liquid of a suspension, comprising, in combination, a body having at opposite ends thereof portions of greatest and smallest diameter, respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; an outwardly flaring annular shield surrounding the portion of smallest diameter of said body; supply means for supplying a suspension to said central recess; means for rotating said body about the axis of said outer surface at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; and a rotary member surrounding said body and having a first portion located in the region of the greatest diameter of said body and forming an opening for the discharge of liquid flowing from said outer surface, and a second outwardly flaring liquid permeable portion for collecting solid particles outwardly thrown from said outer surface and being located opposite the portion of greatest diameter of said flaring annular shield so that said particles move only from the portion of greater diameter of said body to said second portion whereby said solid particles and said liquid are separately recovered.

11. An apparatus for separating solid particles from the liquid of a suspension, comprising, in combination, a body having at opposite ends thereof portions of greatest and smallest diameter, respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; an annular shield surrounding the portion of smallest diameter of said outer surface and having a central portion forming a container adapted to receive a washing liquid; supply means for supplying a suspension to said central recess; means for rotating said body about the axis of said outer surface at such a speed that the suspension flows from said recess onto said outer surface and forms thereon a thin layer and that the centrifugal force acting on said layer is less than the adhesion of the liquid to said outer surface whereby the solid particles move away from said outer surface while the liquid is retained by adhesion on said outer surface; and means for separately recovering said solid particles and said liquid.

12. An apparatus for separating solid particles from the liquid of a suspension, comprising, in combination, a first body having at opposite ends thereof portions of greatest and smallest diameter, respectively, and an outwardly and downwardly flaring outer surface extending between said portions and having a vertical axis, said body also having at said portion of smallest diameter a relatively deep central recess bounded by a surface portion of said body flaring outwardly at least in the region adjacent to the open end of said recess and merging along said open end into said outwardly flaring outer surface of said body; a second annular body surrounding said first body coaxial therewith and having an outwardly and upwardly flaring inner surface of revolution and an outwardly and downwardly flaring outer surface of revolution, said inner surface of revolution having a portion of greatest diameter spaced from the portion of greatest diameter of said first body to form an annular gap therewith, said first and second bodies being secured to each other; an annular shield surrounding the portion of smallest diameter of said first body and having a central portion forming a container adapted to receive a washing liquid; supply means for supplying a suspension to said recess; means for rotating said bodies and said shield about the axis of said surfaces at such a speed that the suspension flows from said recess onto said outer surface of said first body and forms thereon a thin layer and that the centrifugal force acting on said layer is less than the adhesion of the liquid whereby the solid particles move onto said inner surface of said second body while being mixed with washing liquid from said annular shield and from there move to said outer surface of said second body where the solid particles are separated by the action of the centrifugal force from the washing liquid adhering to said outer surface of the second body; and means for separately recovering said solid particles and said liquids.

13. An apparatus for separating solid particles from the liquid of a suspension, comprising, in combination, a body having at opposite ends thereof portions of greatest and smallest diameter, respectively, and an outwardly flaring outer surface between said portions, said body also having at said portion of smallest diameter a relatively deep central recess bounded by a surface portion of said body flaring outwardly at least in the region adjacent to the open end of said recess and merging along said open end into said outwardly flaring outer surface of said body; supply means for supplying a suspension to the center of said recess; means for rotating said body about the axis of said outer surface; a tubular separating member including an outwardly flaring portion surrounding said body adapted to receive smaller solid particles separated from said suspension by the action of centrifugal force and a tubular portion surrounding the outer portion of said body to receive liquid adhering to said outer surface; an outlet chamber means surrounding part of said tubular portion of said separating member for receiving the liquid; a filter element of annular shape surrounding said outwardly flaring portion of said separating member to receive solid particles from the same and having perforations for discharging liquid; a disk member coaxial with said body for receiving larger particles from the center portion of the same, said disk member having an outer portion located adjacent said filter element to deposit said particles on the same; means for rotating said filter element and said disk member; a chamber surrounding a portion of said filter element to receive said solid particles; and another chamber surrounding said filter element in the region of said perforations for receiving liquid separated from said solid particles by the action of the centrifugal force.

References Cited by the Examiner

UNITED STATES PATENTS 2,422,464  6/1947  Bartholomew _____ 210—78 X

REUBEN FRIEDMAN, *Primary Examiner.*

J. DE CESARE, *Assistant Examiner.*